(12) United States Patent
Tichy

(10) Patent No.: US 11,290,259 B2
(45) Date of Patent: Mar. 29, 2022

(54) DATA DISTRIBUTION PLATFORM

(71) Applicant: Gregory Tichy, North Hollywood, CA (US)

(72) Inventor: Gregory Tichy, North Hollywood, CA (US)

(*) Notice: Subject to any disclaimer, the term of this patent is extended or adjusted under 35 U.S.C. 154(b) by 248 days.

(21) Appl. No.: 16/666,026

(22) Filed: Oct. 28, 2019

(65) Prior Publication Data
US 2021/0126775 A1   Apr. 29, 2021

(51) Int. Cl.
*H04L 9/08* (2006.01)
*G06F 21/62* (2013.01)
*H04L 45/12* (2022.01)
*H04L 9/32* (2006.01)

(52) U.S. Cl.
CPC ........ *H04L 9/0825* (2013.01); *G06F 21/6227* (2013.01); *H04L 9/3297* (2013.01); *H04L 45/12* (2013.01)

(58) Field of Classification Search
CPC ..... H04L 9/0825; H04L 45/12; H04L 9/3297; H04L 9/0894; G06F 21/6227; G06F 21/6218
See application file for complete search history.

(56) References Cited

U.S. PATENT DOCUMENTS

| | | | | |
|---|---|---|---|---|
| 6,976,006 | B1 * | 12/2005 | Verma | G06Q 30/0603 705/26.64 |
| 7,149,698 | B2 * | 12/2006 | Guheen | G06Q 50/01 705/319 |
| 7,475,024 | B1 * | 1/2009 | Phan | G06Q 10/087 705/22 |
| 8,499,100 | B1 * | 7/2013 | Rothstein | H03M 7/30 709/247 |
| 2004/0249883 | A1 * | 12/2004 | Srinivasan | G06Q 10/02 709/203 |
| 2005/0015511 | A1 * | 1/2005 | Izmailov | H04L 45/48 709/238 |
| 2011/0106616 | A1 * | 5/2011 | Bigby | G06Q 10/107 705/14.49 |
| 2014/0301545 | A1 * | 10/2014 | Glider | H04L 9/0816 380/28 |

(Continued)

*Primary Examiner* — J. Brant Murphy
(74) *Attorney, Agent, or Firm* — Patent Ingenuity, P.C.; Samuel K. Simpson

(57) ABSTRACT

A computer-implemented platform has a cloud-based offset engine that determines data stored on a local storage device of an external device exceeds a predetermined local data storage threshold, whereby the external device is remotely situated from the computer-implemented platform. Further, the computer-implemented platform has a receiver that receives, via a network, first level encrypted offset data. The encrypted offset data is the data that is encrypted by the external device according to a first encryption key, and that is timestamped by the external device according to a first timestamp. Moreover, the computer-implemented platform has a compression assessment engine that determines that the external device is incapable of performing compression according to one or more predefined compression criteria and that performs compression of the first level encrypted offset data according to the one or more predefined compression criteria to generate compressed and encrypted offset data.

20 Claims, 13 Drawing Sheets

(56) References Cited

U.S. PATENT DOCUMENTS

| | | | |
|---|---|---|---|
| 2015/0206219 A1* | 7/2015 | Zamer | G06Q 30/0629 |
| | | | 705/7.18 |
| 2015/0294383 A1* | 10/2015 | Rosenoff | G06Q 30/0609 |
| | | | 705/26.35 |
| 2016/0110408 A1* | 4/2016 | Madhavarapu | G06F 16/2358 |
| | | | 707/615 |
| 2016/0162913 A1* | 6/2016 | Linden | G06Q 30/0202 |
| | | | 705/7.31 |
| 2017/0272209 A1* | 9/2017 | Yanovsky | H04L 67/1097 |
| 2018/0011867 A1* | 1/2018 | Bowman | G06F 16/278 |
| 2018/0276231 A1* | 9/2018 | Bowman | G06F 3/0604 |
| 2019/0171365 A1* | 6/2019 | Power | G06F 3/067 |
| 2019/0286373 A1* | 9/2019 | Karumbunathan | G06F 3/0619 |
| 2021/0090047 A1* | 3/2021 | Tichy | G06Q 20/202 |

\* cited by examiner

| Node | 1 | 2 | 3 | 4 | 5 | 6 |
|---|---|---|---|---|---|---|
| 1 |  | 5 ms | 58 ms | 17 ms | 39 ms | 11 ms |
| 2 | 10 ms |  | 29 ms | 3 ms | 8 ms | 32 ms |
| 3 | 36 ms | 4 ms |  | 30 ms | 30 ms | 14 ms |
| 4 | 3 ms | 22 ms | 26 ms |  | 23 ms | 1 ms |
| 5 | 43 ms | 30 ms | 6 ms | 30 ms |  | 12 ms |
| 6 | 35 ms | 18 ms | 2 ms | 9 ms | 62 ms |  |

DATA DISTRIBUTION PLATFORM

BACKGROUND

1. Field

This disclosure generally relates to the field of computing systems. More particularly, the disclosure relates to data processing systems.

2. General Background

As use of computing systems continues to become more pervasive, such systems have an increased reliance on electronic storage of data. For example, mobile computing devices (e.g., smartphones, tablet devices, smartwatches, smart wearables, etc.) are often used to obtain data, via software applications, that was previously available only in a paper format. However, users now often use their mobile computing devices to perform a variety of computationally-intensive tasks (e.g., banking, insurance, social media, video conferencing, etc.).

As a result of such increased usage of computing resources, technological infrastructure is having difficulty keeping pace with the increase in computing resource demand. For example, with users wanting to store increased levels of electronic data (e.g., documents, images, videos, audio, etc.), current computing systems have to procure additional servers, network bandwidth, electrical power, etc.

Yet, procuring such additional computing resources is not always feasible or cost effective. Furthermore, increased electrical usage often leads to an increased carbon footprint, thereby potentially having harmful effects on the environment. Additionally, increased usage of computing resources and electricity by multitudes of systems may lead to an increase in disruptions in power. Accordingly, current data processing systems do not effectively manage computing resources based on increased user demand.

SUMMARY

A computer-implemented platform has a cloud-based offset engine that determines data stored on a local storage device of an external device exceeds a predetermined local data storage threshold, whereby the external device is remotely situated from the computer-implemented platform. Further, the computer-implemented platform has a receiver that receives, via a network, first level encrypted offset data. The encrypted offset data is the data that is encrypted by the external device according to a first encryption key, and that is timestamped by the external device according to a first timestamp. Moreover, the computer-implemented platform has a compression assessment engine that determines that the external device is incapable of performing compression according to one or more predefined compression criteria and that performs compression of the first level encrypted offset data according to the one or more predefined compression criteria to generate compressed and encrypted offset data. In addition, the computer-implemented platform has an encryption engine that encrypts the compressed and first level encrypted offset data according to a second encryption key at a second timestamp as compressed and second level encrypted offset data. Also, the computer-implemented platform has a geometrical data composition engine that generates a geometrical data structure having a plurality of nodes. Each of the plurality of nodes is indicative of one of a plurality of servers. Furthermore, the computer-implemented platform has a segmentation engine that segments the compressed and second level encrypted offset data into a quantity of compressed and second level encrypted segments according to a quantity of available servers from the plurality of servers. The computer-implemented platform also has a bridge optimization engine that determines an optimal path along which the plurality of compressed and second level encrypted segments is stored in the geometrical data structure. Finally, the computer-implemented platform has a transmitter that distributes, via the network, each of the quantity of compressed and second level encrypted segments to one of the quantity of available servers based on the optimal path.

Alternatively, a computer program product may have a computer readable storage device with a computer readable program stored thereon that implements the functionality of the aforementioned computer-implemented platform, or a different computer-implemented platform. As yet another alternative, a process that utilizes a processor may implement the functionality of the aforementioned computer-implemented platform, or a different computer-implemented platform.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A data distribution platform is provided to deliver and store data in a computationally efficient, secure, and environmentally-friendly manner. Including one or more various engines, the data distribution platform is able to simultaneously ingest data from a multitude of different devices and distribute that data in a decentralized, encrypted manner to safeguard the data. Furthermore, the data distribution platform allows for efficient searches to be performed on the stored data. As a result, the data distribution platform may enhance computational performance, reduce data storage constraints, reduce network bandwidth, and optimize search performance.

Figure 1:
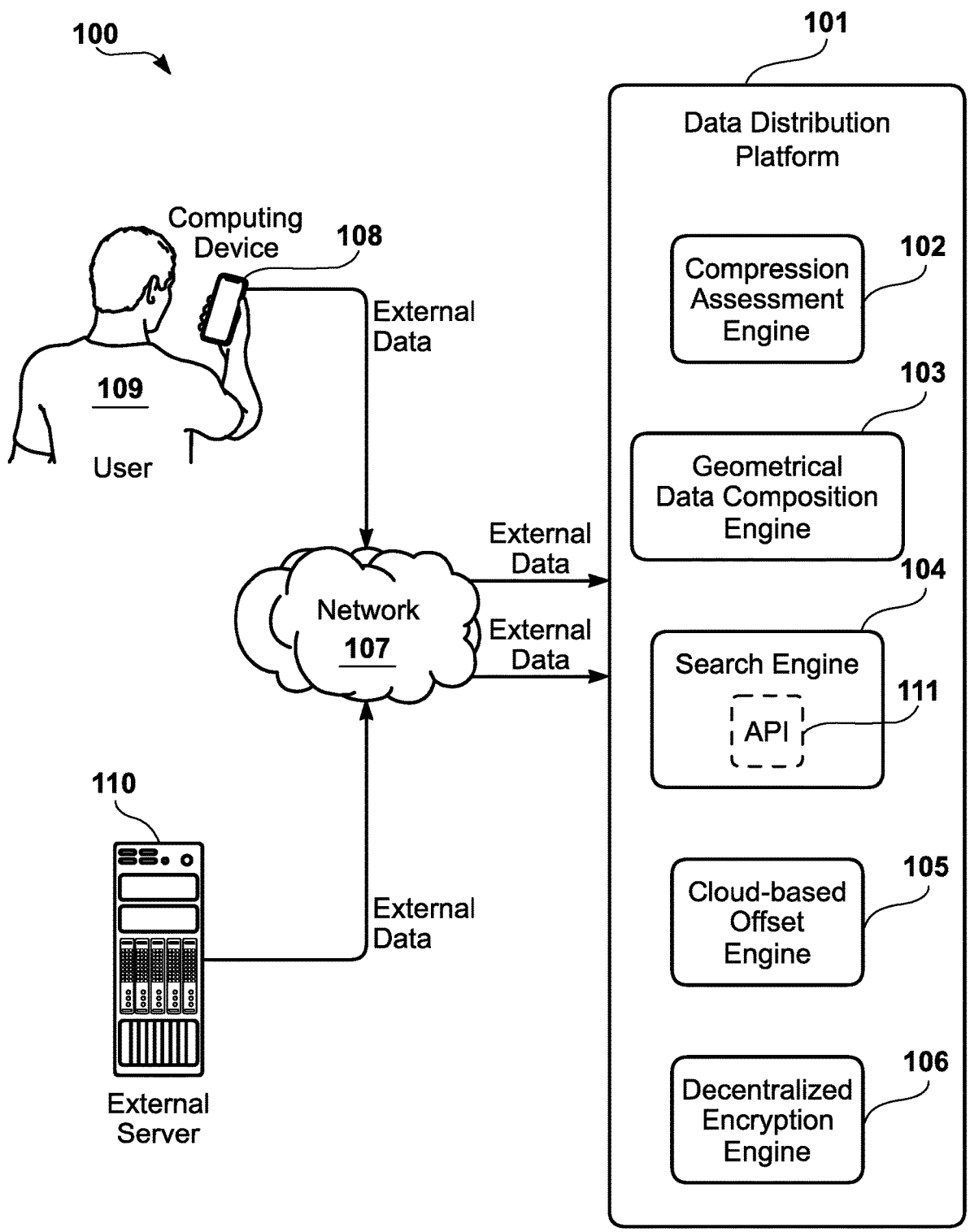
FIG. 1 illustrates a data distribution system.

FIG. 1 illustrates a data distribution system 100. In particular, the data distribution platform 101 may include a plurality of engines, such as a compression assessment engine 102, a geometrical data composition engine 103, a search engine 104, a cloud-based offset engine 105, and a decentralized encryption engine 106. The interaction between these different engines allows data to be stored and delivered via a digital three-dimensional ("3-D") virtual space (or, as an alternative, via a digital two-dimensional ("2-D") virtual space), thereby improving data storage and retrieval. Furthermore, the data received may be data that is external to the data distribution platform 101, and that may be platform-independent. For example, the data may be received from a computing device 108 (personal computer ("PC"), laptop computer, smartphone, tablet device, smartwatch, etc.) used by a user 109. As another example, the external data may be received from an external server 110. (Devices other than the computing device 108 or the external server 110 may send the external data; these are only intended as examples.) Such devices may have different computational and transmission capabilities, yet the data distribution platform 101 is still able to process the external data in a device-independent manner, after being received via a network 107 (remote or local). Accordingly, the external data may encompass a variety of different types of data (financial, insurance, personal, corporate, merchant, products, services, advertising, video, audio, etc.).

In order to request that actions be performed by the data distribution platform 101, an external device (e.g., the computing device 108 or the external server 110) may make functional calls to an Application Programming Interface ("API") residing on the data distribution platform 101. For example, the search engine 104 may have an API 111 that the external device may use to perform search queries via the search engine 104. The API 111 is only one example of use of an API within the data distribution platform 101, given that other APIs may be used for any of the other engines (e.g., the compression assessment engine 102, the geometrical data composition engine 103, the cloud-based offset engine 105, or the decentralized encryption engine 106) of the data distribution platform 101. Furthermore, in one embodiment, the API 111, or a different API, may be in communication with, or operated by, an artificial intelligence ("AI") system that generates recommendations, based on machine learning, to process data received and commands performed via the API in an optimal manner (e.g., determining the fastest delivery path for the external data, determining the least processing power utilized by servers to perform delivery of the external data, etc.). In other words, the data distribution platform 101 may use one or more APIs to determine which engine(s) should process the external data, and how that external data should be processed, to efficiently utilize computing resources throughout the data distribution platform 101.

Figure 2A:
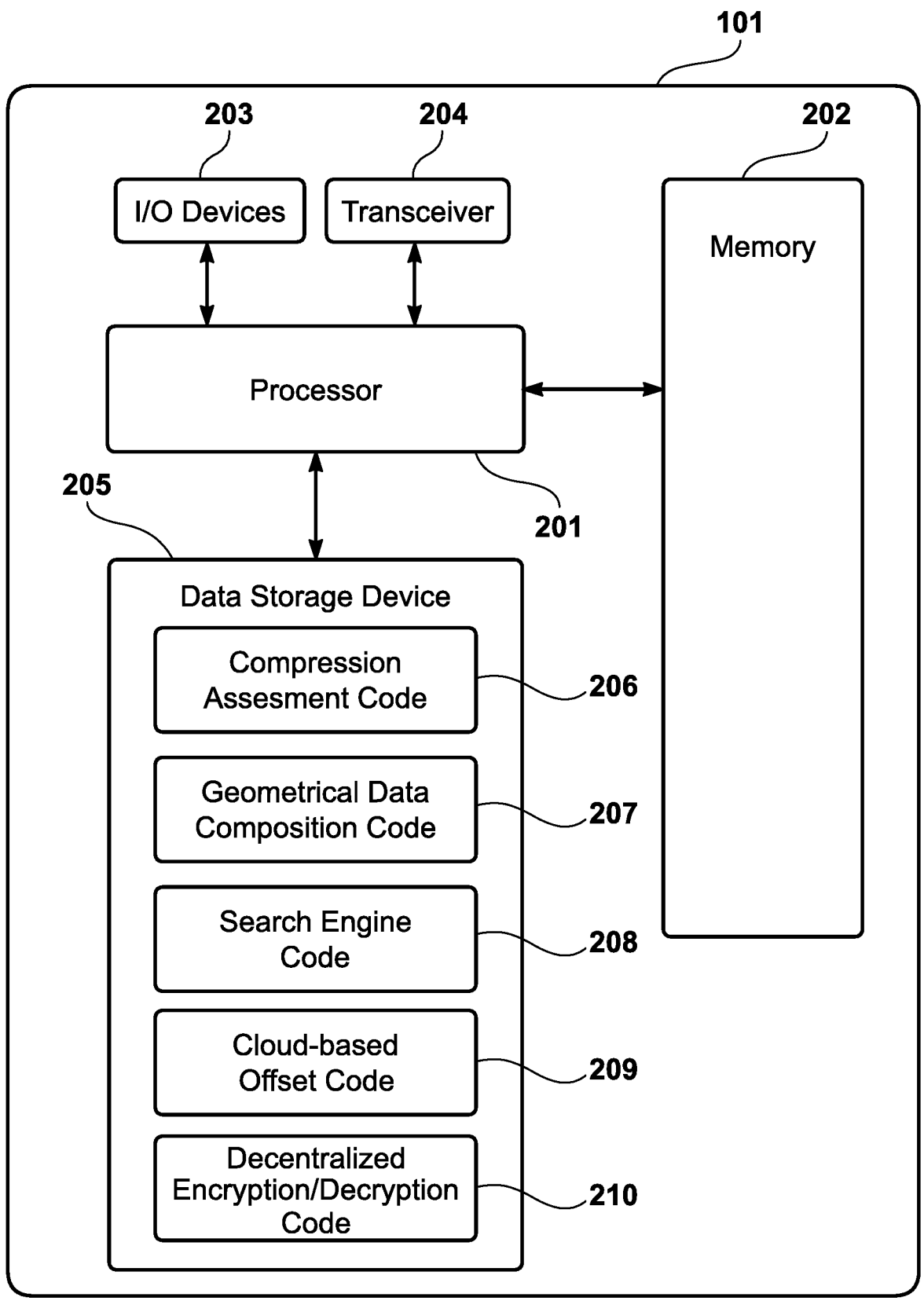
FIG. 2A illustrates a system configuration for the data distribution platform illustrated in FIG. 1.
Figure 2B:
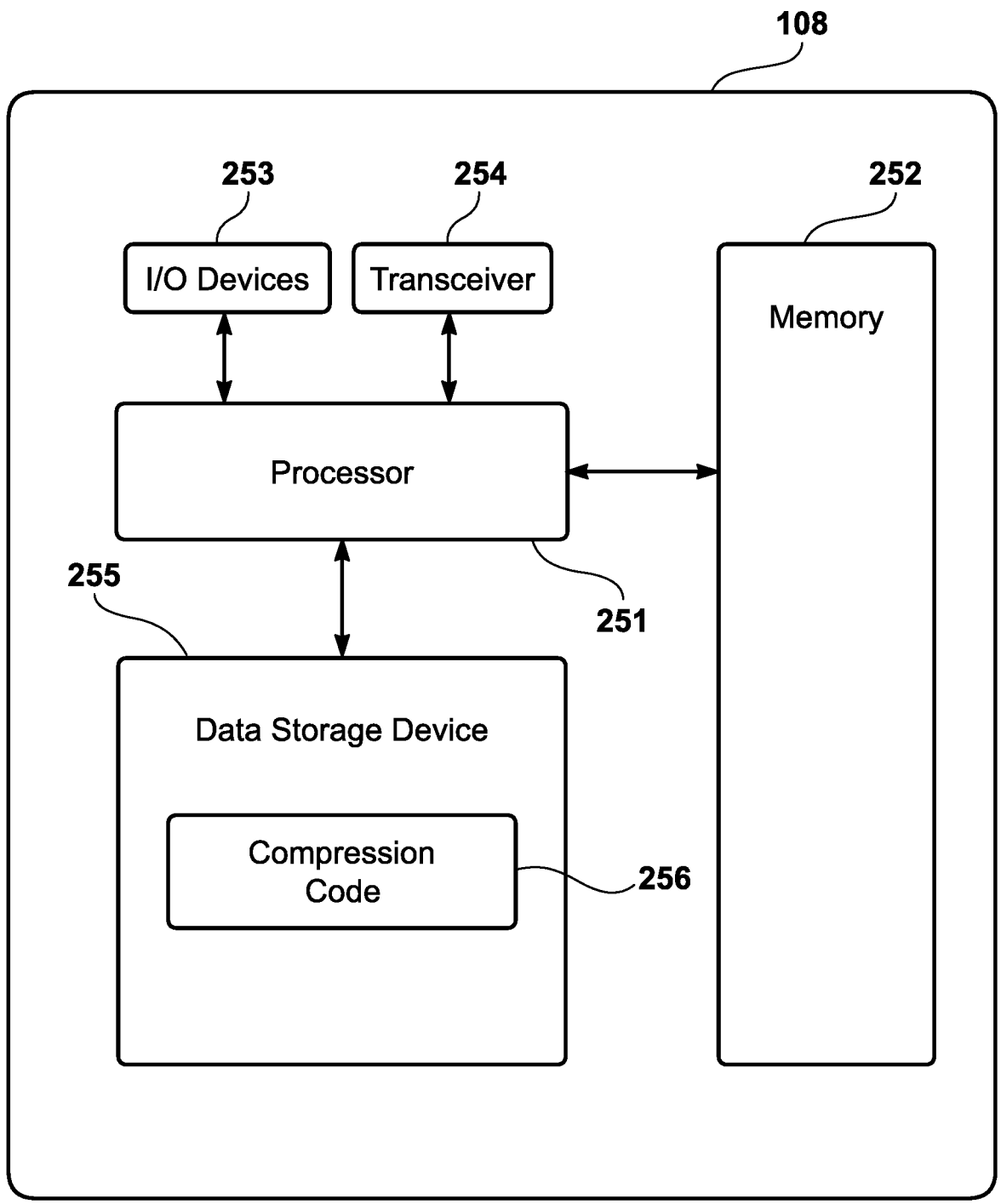
FIG. 2B illustrates a system configuration for the computing device illustrated in FIG. 1.

FIGS. 2A and 2B illustrate various system configurations that may be used to implement the data distribution system 100 illustrated in FIG. 1. For example, FIG. 2A illustrates a system configuration for the data distribution platform 101 illustrated in FIG. 1. The internal components of the data distribution platform 101 include a processor 201, which may be specialized for generating a geometrical data structure representative of servers storing data at various geographical locations, offsetting external data received from devices external to the data distribution platform 101, performing decentralized encryption of the stored data, and performing optimized searches on the stored data. Further, the internal components of the data distribution platform 101 may include a memory device 202, which may be specialized for storing the geometrical data structure. For example, the memory device 202 may be optimized to improve access to the stored data via an optimal path between nodes positioned within the geometrical data structure.

The memory device 202 may temporarily store computer readable instructions performed by the processor 201. As an example of such computer readable instructions, a data storage device 205 within the data distribution platform 101 may store compression assessment code 206 that may determine whether an external device is capable of performing a particular type of compression. Based on that determination, the data distribution platform 101 may proceed with performing compression on behalf of the external device, or may allow the external device to perform the compression itself. As another example of the computer readable instructions, the data storage device 205 within the data distribution platform 101 may store geometrical data composition code 207 to generate a geometrical data structure indicative of potential data transmission paths between servers. Additionally, as another example of the computer readable instructions, the data storage device 205 within the data distribution platform 101 may store search engine code 208 to perform search queries to retrieve data stored along the data transmission paths of the geometrical data structure. Moreover, as another example of the computer readable instructions, the data storage device 205 within the data distribution platform 101 may store cloud-based offset code 209 to perform data offsets from external devices to the geometrical data structure, based on local storage devices of the external devices exceeding data storage thresholds (predetermined or determined on-the-fly). As a final example of the computer readable instructions, the data storage device 205 within the data distribution platform 101 may store decentralized encryption/decryption code 210 to perform decentralized encryption/decryption of data stored by multiple servers throughout the geometrical data structure. In other words, the data distribution platform 101 may segment data into a plurality of segments, and encrypt those segments for storage at various servers. Accordingly, a single server would not store all of the data in one location, thereby improving security of the data.

The data distribution platform 101 may also have a transceiver 204 that transmits and receives data. (Alternatively, a distinct transmitter and receiver may be used instead.) Additionally, the data distribution platform 101 may have one or more input/output ("I/O") device 203 (e.g., microphone, keyboard, gesture detection device, etc.) that may be used to provide inputs and/or outputs to the data distribution platform 101.

Furthermore, FIG. 2B illustrates a system configuration for the computing device 108 illustrated in FIG. 1. (Alternatively, the system configuration may be implemented for a different device other than the computing device 108, such as the external server 110.) The internal components of the computing device 108 include a processor 251, which may be specialized for assessing compression constraints to determine whether the computing device 108 has the capability of performing compression for a particular set of content, or whether the data distribution platform 101 should perform that compression. Additionally, the computing device 108 may have a memory device 252 that may temporarily store computer readable instructions performed by the processor 251. As an example of such computer readable instructions, a data storage device 255 within the data distribution platform 101 may store compression code 256, which allows the processor 201 to perform compression of the external data before sending it to the data distribution platform 101. In an alternative embodiment, the compression code 256 may be stored on data storage device 205 of the data distribution platform 101, illustrated in FIG. 1.

The computing device 108 may also have a transceiver 254 that transmits and receives data. (Alternatively, a distinct transmitter and receiver may be used instead.) Additionally, the data distribution platform 101 may have one or more input/output ("I/O") device 253 (e.g., microphone, keyboard, gesture detection device, etc.) that may be used to provide inputs and/or outputs to the computing device 108.

Figure 3:
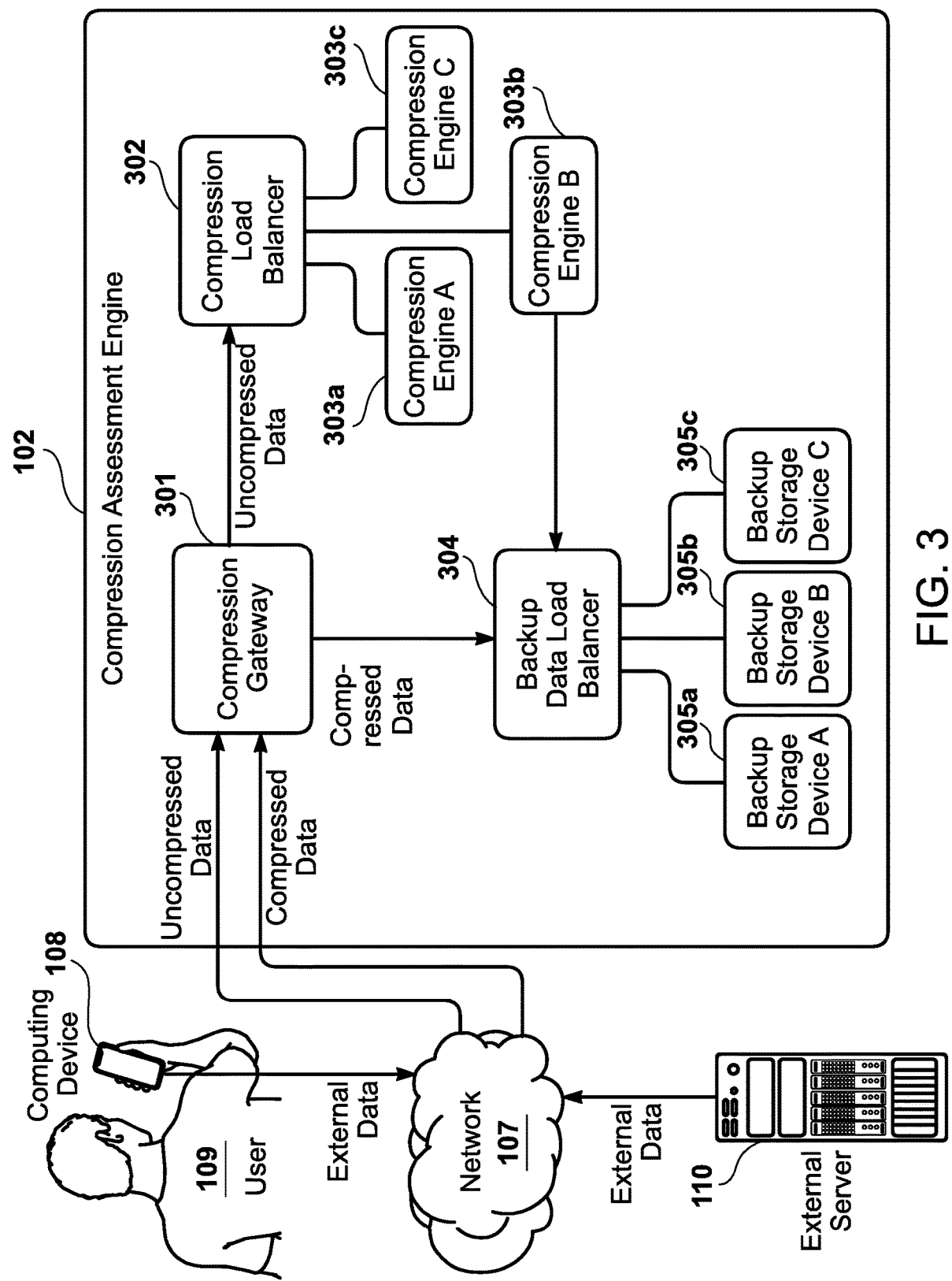
FIG. 3 illustrates an expanded view of the compression assessment engine of the data distribution platform illustrated in FIG. 1.

FIG. 3 illustrates an expanded view of the compression assessment engine 102 of the data distribution platform 101 illustrated in FIG. 1. In particular, the compression assessment engine 102 may have a compression gateway 301 that determines whether an external device, such as the computing device 108 or the external server 110, is capable of performing compression of the external data for storage in the geometrical data structure. For example, the compression gateway 301 may poll the external device prior to receiving the external data to determine whether the external device has the compression capability to perform compression of the external data; such polling may include one or more communications between the compression gateway 301 and a software application stored on the external device to determine the compression capability of the external device. For example, the compression gateway 301 may query the software application to determine if the software application is capable of performing any form of compression, and more specifically what particular type of compression. The compression gateway 301 may even poll the software application to determine if the software application is capable of performing the compression according to one or more compression parameters (e.g., within a certain period of time). Accordingly, the compression gateway 301 may determine whether the software application stored on the external device has compression capability according to one or more predefined criteria. Upon performing such assessment, the compression gateway 301 may provide an indication to the external device, via the network 107, to transmit the external in compressed or uncompressed form. For example, if the compression gateway 301 determines that the external device is capable of performing the compression according to the one or more predefined criteria, the compression gateway 301 may send a message to the external device to proceed with compression, and then transmit the data in compressed form to the data distribution platform 101. Conversely, if the compression gateway 301 determines that the external device is incapable of performing the compression according to the one or more predefined criteria, the compression gateway 301 may send a message to the external device to send the data in uncompressed form to the data distribution platform 101. (Although the compression gateway 301 is illustrated as being implemented on the data distribution platform 101, it may, alternatively, be implemented on the external device.)

Accordingly, the compression gateway 301 avoids unnecessary usage of bandwidth over the network 107 to transmit data until a compression assessment is performed. For instance, the compression gateway 301 avoids data being sent from the external device in an incorrect compression format, to only then generate an error when received at the data distribution platform 101.

After providing an indication to the external device of how the external data should be sent (compressed or uncompressed by the external device as determined by the compression assessment), the compression gateway 301, or another component of the data distribution platform 101, receives the external data in the requested form (compressed or uncompressed). If the compression gateway 301 receives the external data in compressed form from the external device, the compression gateway 301 may provide the compressed data to a backup data load balancer 304, which manages storage optimization amongst a plurality of backup storage devices 305a-c (e.g., disk drives, servers, etc.). (Three back storage devices are illustrated only as examples; more or less backup storage devices may be used instead.) In other words, the backup data load balancer 304 selects which of the backup storage devices 305a-c should be used to store the compressed data. The backup data load balancer 304 may utilize a variety of factors in such determination (e.g., available storage, bandwidth, location, storage speed, etc.) to optimize storage of the compressed data across all backup data storage devices 305a-c.

Conversely, if the compression gateway 301 determines that the external data has to be compressed, because the external device was unable to perform the data compression according to the one or more predefined compression criteria, the compression gateway 301, or another component of the data distribution platform 101, may perform the compression. For example, the compression gateway 301 may provide the external data to a compression load balancer 302, which manages compression optimization amongst a plurality of compression engines 303a-c. (Three compression engines are illustrated only as examples; more or less compression engines may be used instead.) The compression load balancer 302 may utilize a variety of factors in such determination (e.g., current compression engine availability, bandwidth, compression speed, etc.) to optimize compression of the external data, while simultaneously optimizing the compression of other external data received from other external devices. Upon completion of the compression, the selected compression engine may send the external data to the backup data load balancer 304 to perform the data storage backup of the compressed data.

By implementing the compression load balancer 302 and the backup data load balancer 304, as illustrated in FIG. 3, the compression assessment engine 102 is able to take in to account the particular capabilities of certain resources (e.g., servers), and assign tasks accordingly. For example, a particular set of external data may be significant in size, thereby befitting processing by the server with the fastest processing capabilities and memory availability. Conversely, another set of external data may be relatively miniscule in size such that the processing of that data by any of the available servers would not result in a noticeable processing time difference, thereby befitting processing by the server with the slowest processing capabilities and/or least amount of memory availability; consequently, the fastest servers are persevered for more significant workloads.

Although the compression load balancer 302 and the backup data load balancer 304 are illustrated in FIG. 3, in an alternative embodiment, the compression assessment engine 102 may perform backup data storage and/or compression without the compression load balancer 302 and/or the backup data load balancer 304. As an example, the compression assessment engine 102 may utilize a queue-based data structure (e.g., a first-in-first-out ("FIFO") data structure) to perform data backups and compression in a serial manner based on resource availability.

The compression assessment engine 102 may also be utilized by the data distribution platform 101 to perform decompression of external data, whether or not the compression was performed by the compression assessment engine 102 or by an external device.

Furthermore, in an alternative embodiment, the data distribution platform 101 may perform the functionality described herein by compressing some external data and leaving other external data uncompressed. For example, the compression assessment engine 102 may determine that performing compression for particular external data according to a particular compression format involves more, or almost as many, computational resources as delivering the data in an uncompressed form; thus, the compression assessment engine 102 may leave the external data in an uncompressed form. Additionally, the data distribution platform 101 may utilize the backup data load balancer 304 to perform data backups on the uncompressed data in combination with, or in isolation of, the compressed data. In another embodiment, the data distribution platform 101 may perform the functionality described herein by not performing any compression.

Figure 4A:
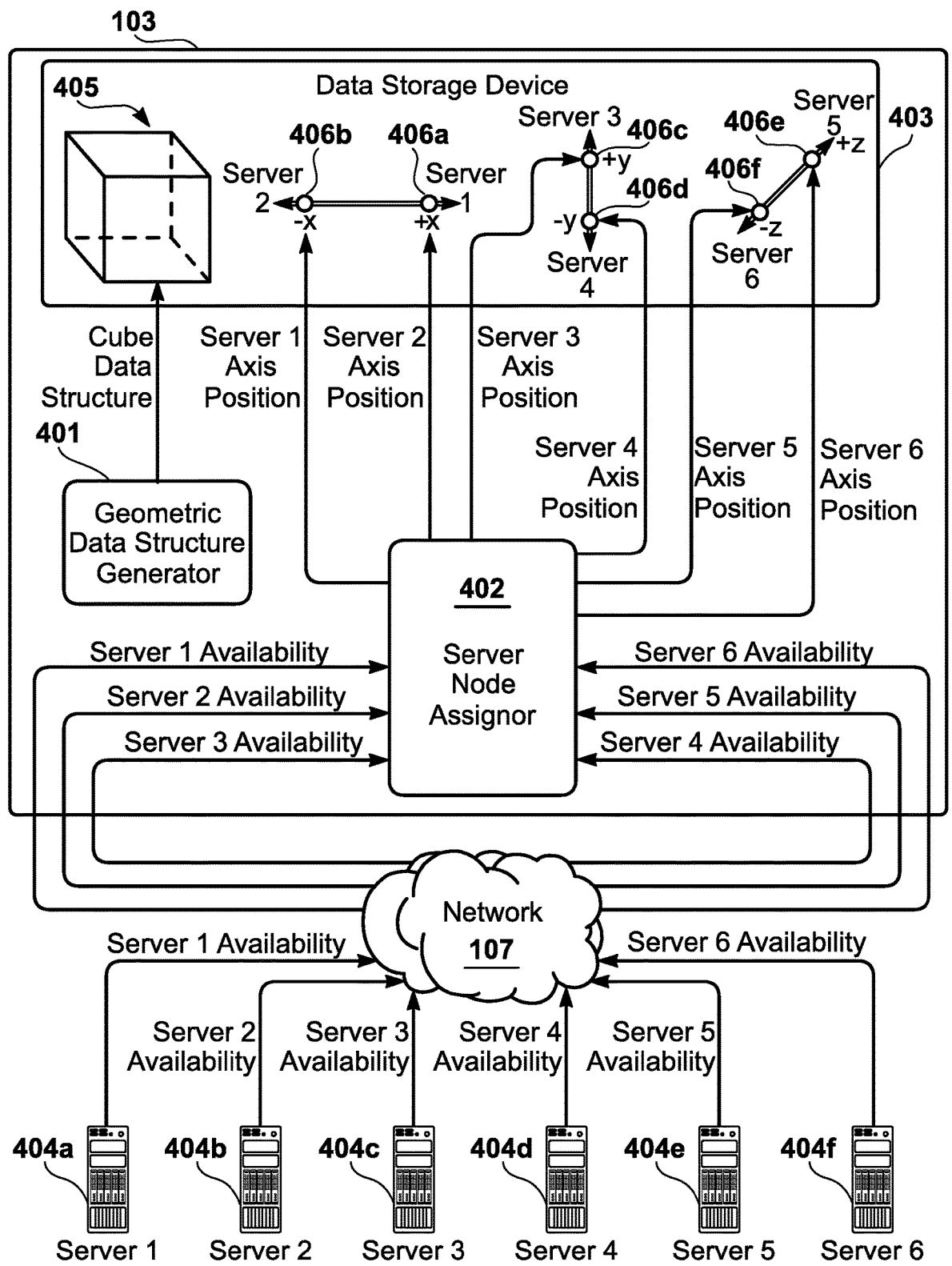
FIG. 4A illustrates the components of the geometrical data composition engine that are used to generate a geometrical data structure, which may be used to indicate pathways between various remotely situated servers storing data via the data distribution system illustrated in FIG. 1.
Figure 4B:
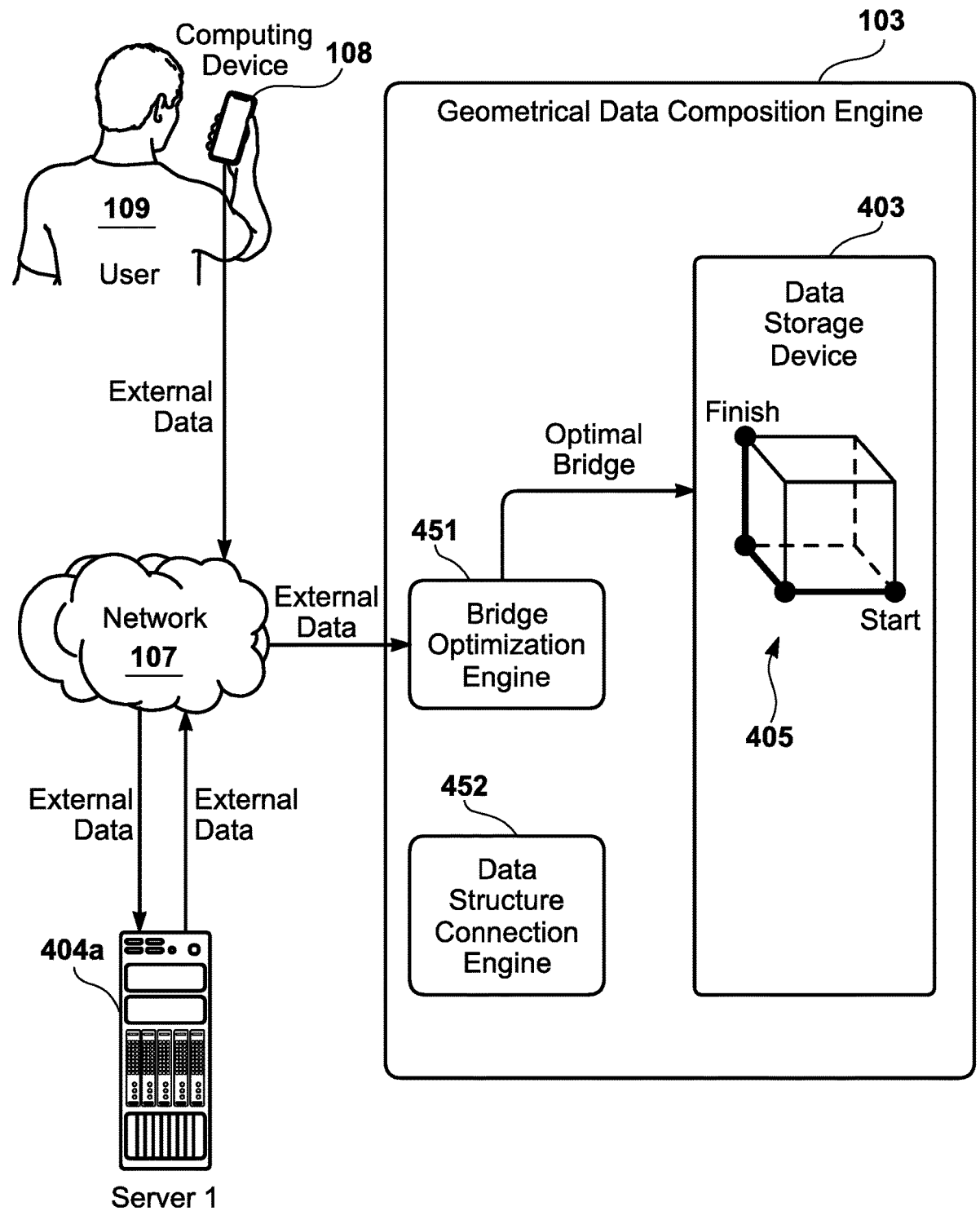
FIG. 4B illustrates the components of the geometrical data composition engine 103 that are used to determine an optimal bridge between servers, such as the servers illustrated in FIG. 4A.

Further, FIGS. 4A and 4B illustrate an expanded view of the geometrical data composition engine 103 illustrated in FIG. 1. In particular, FIG. 4A illustrates the components of the geometrical data composition engine 103 that are used to generate a geometrical data structure 405, which may be used to indicate pathways between various remotely situated servers storing data via the data distribution system 100 illustrated in FIG. 1. The data may be stored in the geometrical data structure in a compressed form or an uncompressed form.

Prior, or subsequent, to receiving external data, the data distribution platform 101 may use the geometrical data structure generator 401 to generate the geometrical data structure 405 for storage in the memory device 202, illustrated in FIG. 2A. In essence, the geometrical data structure generator 401 may generate an empty data structure, which the data distribution platform 103 may subsequently populate as it assigns servers to the geometrical data structure 405 and as it receives external data in compressed form via the compression assessment engine 102, illustrated in FIG. 3, for storage at the various servers. (Alternatively, the geometrical data structure 405 may store data in an uncompressed form.) In other words, the geometrical data structure 405 may indicate various pathways between assigned servers, and potentially an indication of the external data (e.g., data identifier, data type, etc.) stored at the various servers.

As an example, FIG. 4A illustrates a plurality of servers 404a-404f that participates in the data distribution system 100, illustrated in FIG. 1, via the network 107. (Six servers are illustrates just for the purpose of this example; more or less servers may be used in conjunction with the data distribution system 100.) At various times, each of the plurality of servers 404a-404f may provide an indication of availability to the data distribution platform 101. Subsequently, a server node assignor 402 assigns a particular server to a particular node within the geometrical data structure 405. For example, the geometrical data structure 405 may be a cube. (A cube is only illustrated and described for the purpose of this example; other types of geometrical shapes, 3-D or 2-D, (e.g., cylinder, sphere, square, rectangle, etc.) may be used instead.) Given the 3-D characteristics of a cube, an x-axis, a y-axis, and a z-axis may each have various nodes spanning their associated ranges (e.g., +x, −x, +y, −y, +z, and −z). For instance, the server node assignor 402 may assign the first server 404a a first server position 406a at one end of the x-axis (e.g., +x), the second server 404b a second server position 406b at the opposite end of the x-axis (e.g., −x), the third server 404c a third server position 406c at one end of the y-axis (e.g., +y), the fourth server 404d a fourth server position 406d at the opposite end of the y-axis (e.g., −y), the fifth server 404e a fifth server position 406e at one end of the z-axis (e.g., +z), and the sixth server 404f a sixth server position 406f at the opposite end of the z-axis (e.g., −z).

As a result, in the foregoing example, the geometrical data structure 405 is populated to have the corresponding nodes of the servers 404a-404f positioned at the corners of the geometrical data structure 405. However, different or additional nodes may be positioned along different portions of an edge of the cube (e.g., halfway along an edge, a third along the edge, etc.). In one embodiment, the positions of the nodes within the geometrical data structure 405 are indicative of relative geographical positioning of the servers. For example, the first server position 406a may be positioned at one extreme along the x-axis of the cube to indicate that the first server 404a is physically located at one physical boundary of a city represented by the cube, whereas the second server position 406b may be positioned at another extreme along the x-axis of the cube to indicate that the second server 404b is physically located at a physical boundary of the city at a physical boundary on the opposite side of the city. (A city is just provided as an example, given that the geometrical data structure 405 may correspond to other types of geographical locations (e.g., states, countries, locations within a server farm, etc.).) In another embodiment, the positions of the nodes within the geometrical data structure 405 are indicative of data transmission speeds, which may not necessarily correlate to physical locations. For example, the first server position 406a and the second server position 406b may be positioned at opposite extremes along the edge of the cube to indicate a relatively slow transmission speed between these two servers, even though they may be physically located in closer proximity to one another than other servers (e.g., two servers that are positioned on the x-axis, but not at opposite extremes.). In yet another embodiment, the positions of the nodes within the geometrical data structure 405 are indicative of network bandwidth; servers positioned more closely together may have more network bandwidth for communications than those that are positioned at farther extremes along the same axis, or along a pathway involving multiple axes.

As a result, the data distribution platform 101 may retrieve the server assigned geometrical data structure 405 to determine an optimal pathway for storage of the external data received from an external device. FIG. 4B illustrates the components of the geometrical data composition engine 103 that are used to determine an optimal bridge (i.e., pathway) between servers, such as the servers 404a-f illustrated in FIG. 4A. For instance, an external device, such as the computing device 108 operated by the user 109, may store external data via the network 107 on the first server 404a. Subsequently, the computing device 108 may want to send the data stored on the first server 404 to another server (e.g., for backup) to another server participating in the data distribution system 100. Accordingly, the first server 404, or the computing device 108 itself, may send the external data through the network 107 to one or more of the servers represented via the geometrical data structure 405. (Instead of being predefined prior to receiving the external data, the geometrical data structure 405 may, alternatively, be generated on-the-fly. In other words, the geometrical data structure 405 may be an on-demand data structure that is generated when first necessary based upon server factors (e.g., geographical position, bandwidth, processing capabilities, etc.) known at that time.) The bridge optimization engine 451 may then calculate an optimal bridge between the first server 404 and the intended server for data delivery. For example, the computing device 108 may request that the external data be backed up from the first server 404a onto the third server 404c. By traversing the various possible edges of the geometrical data structure 405, the bridge optimization engine 451 may determine that, from start to finish, an optimal bridge is a pathway from the first server position 406a to the second server position 406b along the x-axis, from the second server position 406b to the sixth server position 406f along the z-axis, and from the sixth server position 406f to the third server position 406c along the y-axis.

Accordingly, in one embodiment, the bridge optimization engine 451 determines an optimal bridge by traversing along possible edges of the geometrical data structure 405.

Figures 4C, 4D:
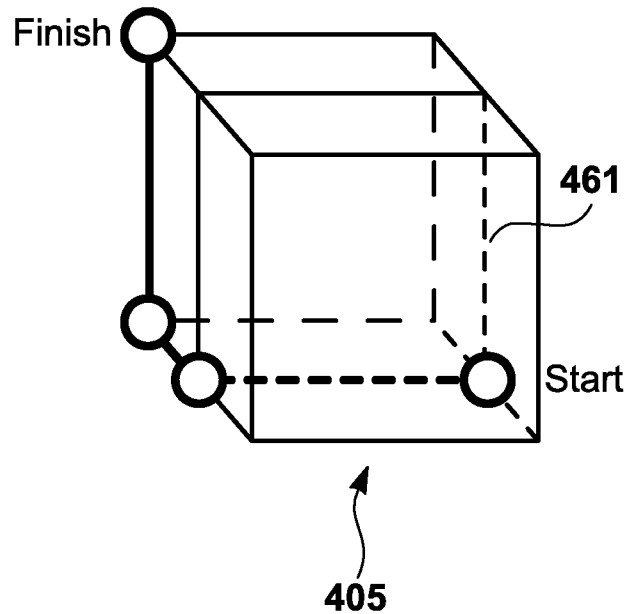
FIG. 4C illustrates the second server position alternatively being positioned halfway along the x-axis.
FIG. 4D illustrates a two-dimensional ("2-D") array with rows and columns, whereby each row designates a particular node in the geometrical data structure, each column designates a particular node in the geometrical data structure, and an entry in the 2-D array represents a statistical indicator associated with an edge between the two nodes of the corresponding row and column.

Additionally, the optimal bridge may be determined based on possible traversal of edges of planes of the geometrical data structure. For example, as illustrated in FIG. 4C, the second server position 406b may have, alternatively, been positioned halfway along the x-axis. The optimal path would have then been halfway along the x-axis, and straight along an edge of a vertical plane 461 bisecting the cube to a server positioned along that edge on the z-axis. In other words, the bridge optimization engine 451 may only permit traversal of edges of planes parallel to the x, y, and z axes of the cube, not diagonal traversals. In an alternative embodiment, the bridge optimization engine 451 may also perform diagonal traversals. (In a geometrical configuration without typical edges, such as a sphere, the nodes may be positioned along a circumference of a shape resulting from a plane intersecting the sphere.)

In one embodiment, the geometrical data structure 405 is stored in the memory device 202, illustrated in FIG. 2A, as a matrix of different possible pathways, and vectors corresponding to the different axes. Furthermore, the bridge optimization engine 451 may retrieve all of the possible pathways between the first server position 406a and the third server position 406c to determine the optimal pathway. For example, the bridge optimization engine 451 may perform a probability analysis by analyzing statistical patterns from previous traversals along the possible pathways. The bridge optimization engine 451 may then assign a probability to each of the possible pathways between the first server position 406a and the third server position 406c to determine which pathway has the highest probability of facilitating the fastest delivery time between the first server position 406a and the third server position 406c.

As an example, as illustrated in FIG. 4D, the memory device 202 may store a 2-D array 471 with rows and columns, whereby each row designates a particular node in the geometrical data structure 405, each column designates a particular node in the geometrical data structure 405, and an entry in the 2-D array represents a statistical indicator (e.g., processing time, bandwidth, etc.) associated with an edge between the two nodes of the corresponding row and column. Accordingly, the bridge optimization engine 451 may analyze all of the different potential edges, tabulate the total statistical indicators for each pathway, and determine the pathway with the highest probability for the fastest transmission time. In one embodiment, an AI system may be used to perform the foregoing probabilistic analysis. For example, the AI system may utilize machine learning to analyze statistical patterns of what previous pathways were most optimal, and generate one or more recommendations based on such analyses. Furthermore, the geometrical data composition engine 103 may utilize a data structure connection engine 452 to transmit the data along the optimal bridge corresponding to the highest probability pathway.

Figure 5A:
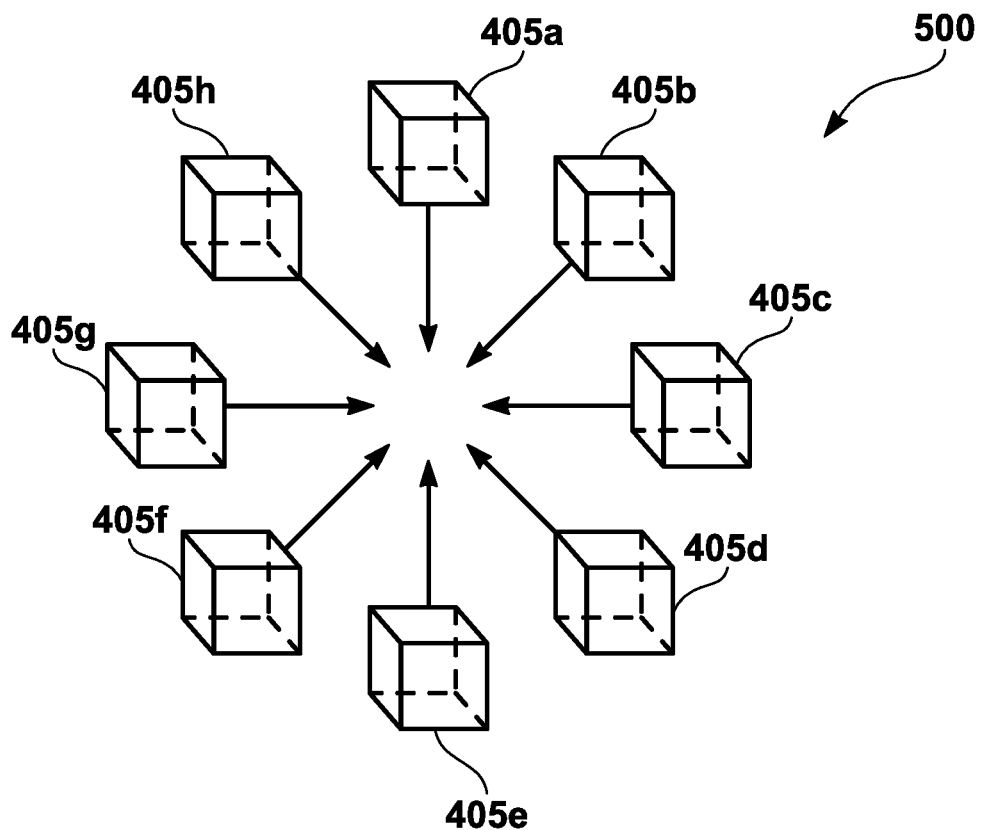
FIG. 5A illustrates a plurality of geometrical data structures.
Figure 5B:
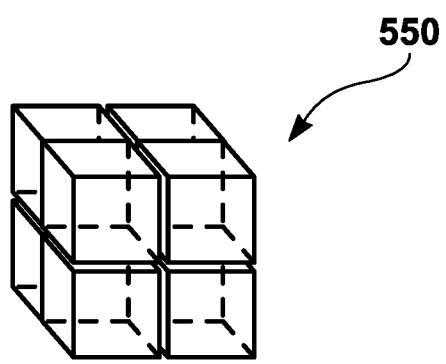
FIG. 5B illustrates an interconnected configuration.

Although one cube is illustrated in FIGS. 4A and 4B, the data distribution system 100 illustrated in FIG. 1 may generate multiple geometric data structures to form an interconnected geometrical data structure configuration. FIGS. 5A and 5B illustrate an interconnection configuration 500. In particular, FIG. 5A illustrates a plurality of geometrical data structures 405a-405f (e.g., cubes). For example, each of the geometrical data structures 405a-405f may correspond to a country, and the possible bridges within severs geographically located in that corresponding country. FIG. 5B illustrates an interconnected configuration 550. In essence, the data distribution platform 101, illustrated in FIG. 1, generates a composite of the individual geometrical data structures 405a-405f to interconnect the insulated pathways within one sub-cube to the insulated pathways of another sub-cube. For example, the interconnected configuration 550 may represent a global geometric data structure of interconnected countries.

In one embodiment, the interconnected configuration 550 is modular. Accordingly, an insulated sub-cube (e.g. geometrical data structure 405a) may be modified/replaced without affecting the remaining sub-cubes within the interconnected configuration 550. Therefore, the functioning of a computer is improved such that an entire interconnected configuration 550 does not have to be taken offline and modified if less than all of the sub-cubes necessitate replacement/modification.

Figure 6:
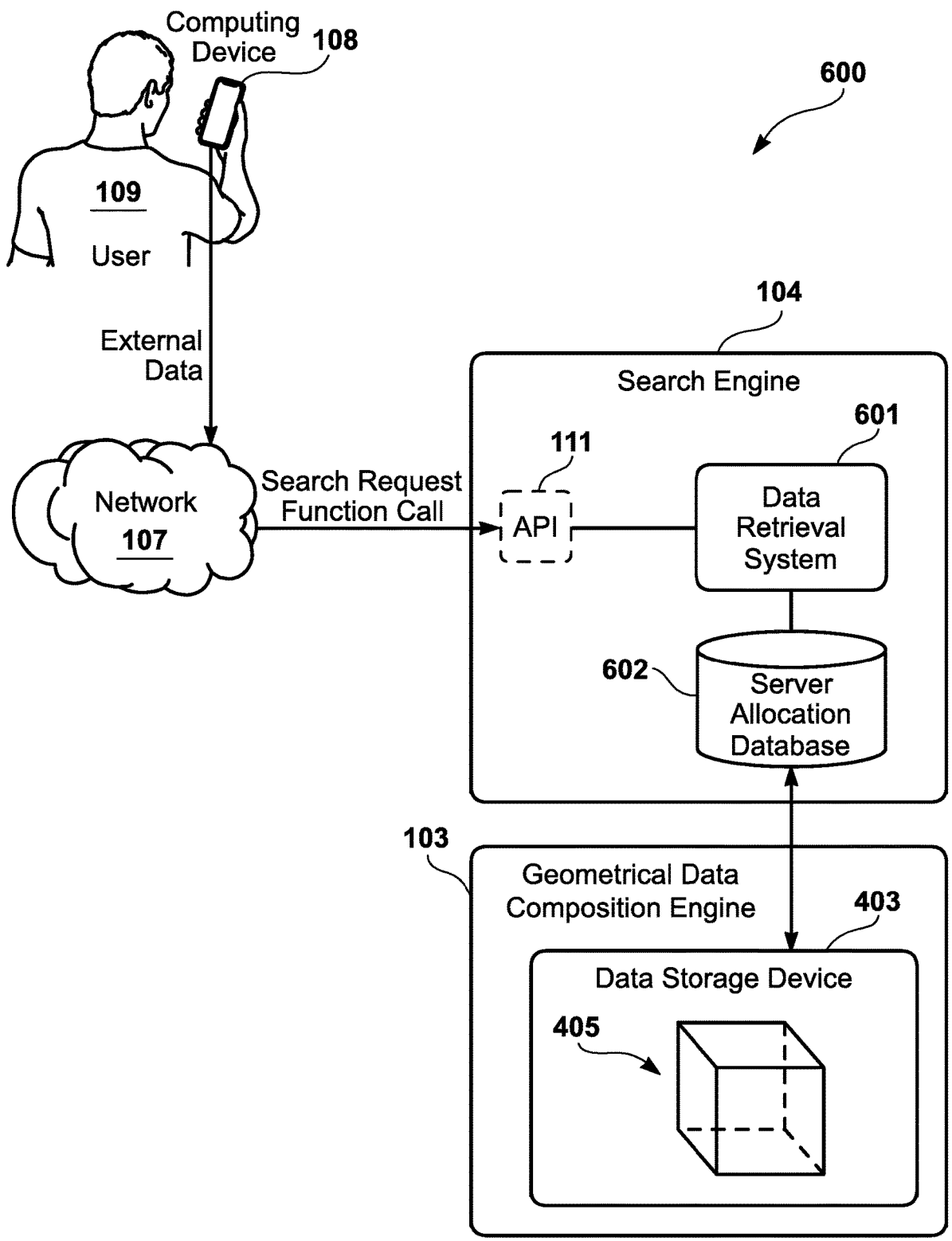
FIG. 6 illustrates an expanded view of the search engine illustrated in FIG. 1.

Subsequent to storage of the external data, an external device may want to retrieve the data. The external device may be the same, or different, device that initially requested the external data be stored in a geometrical data structure 405, as illustrated in FIGS. 4A and 4B, in compressed or uncompressed form. FIG. 6 illustrates an expanded view of the search engine 104 illustrated in FIG. 1. In one embodiment, the search engine 104 has an API 111, which allows an external device (e.g., computing device 108) to make a functional call with a search request via the network 107. Upon receiving the search request, the search engine 104 may use a data retrieval system 601 to perform a search for the requested data. In particular, the data retrieval system 601 may access a server allocation database 602, which indicates the particular server, and potentially the optimal bridge via the geometrical data structure 405, at which the particular data is stored. For example, the server allocation database 602 may be in operable communication with the geometrical data composition engine 103 to have access to the geometrical data structure 405 stored on the data storage device 406.

Furthermore, in one embodiment, the bridge optimization engine 451 illustrated in FIG. 4B is used to determine a delivery optimal bridge which the data structure connection engine 452 uses to actually deliver data from one server to another, but then is used to determine a search optimal bridge, which may be different from the delivery optimal bridge, to traverse to perform the search for the search engine 104. For instance, what was an optimal bridge at the time of delivery may no longer be an optimal bridge at a subsequent time during a search (i.e., server capacity changes, bandwidth changes, server replacements, etc.). Accordingly, the search engine 104 is optimized to improve search query times in a dynamic, real-time manner via the geometrical data structure 405 based on real-time adjustments to the optimal bridge determination.

The configurations illustrated in FIGS. 1-6 allow for ingestion of external data of various types selected via a user input received from the user 109 operating the computing device 108, or automatically received from the external server 110. Additionally, the configurations illustrated in FIGS. 1-6 may be used to perform a data offset, from an external device to a server participating in the data distribution system 100, based on a determination that data stored on the external device exceeds a predetermined local data storage threshold. For example, the computing device 108 may have a predetermined local data storage threshold of ten gigabytes. Upon attempting to store a file that exceeds that threshold, the computing device 108 may attempt to offset the additional data to the data distribution system 100. In essence, the user 109 can bypass the storage limitations of the computing device 108, thereby reducing the memory constraints of the computing device 108 when performing other tasks.

In one embodiment, the search engine 104 may receive search queries via one or search engines external to the data distribution system 100. For example, a third-party search engine may search not only its corresponding databases, but also the geometrical data structure 405 via the API 111. Conversely, the search engine 104 may search the geometrical data structure 405 via the data distribution platform 101, and also one or more third-party search engines external to the data distribution system 100 via one or more APIs of the one or more third-party search engines.

Figure 7:
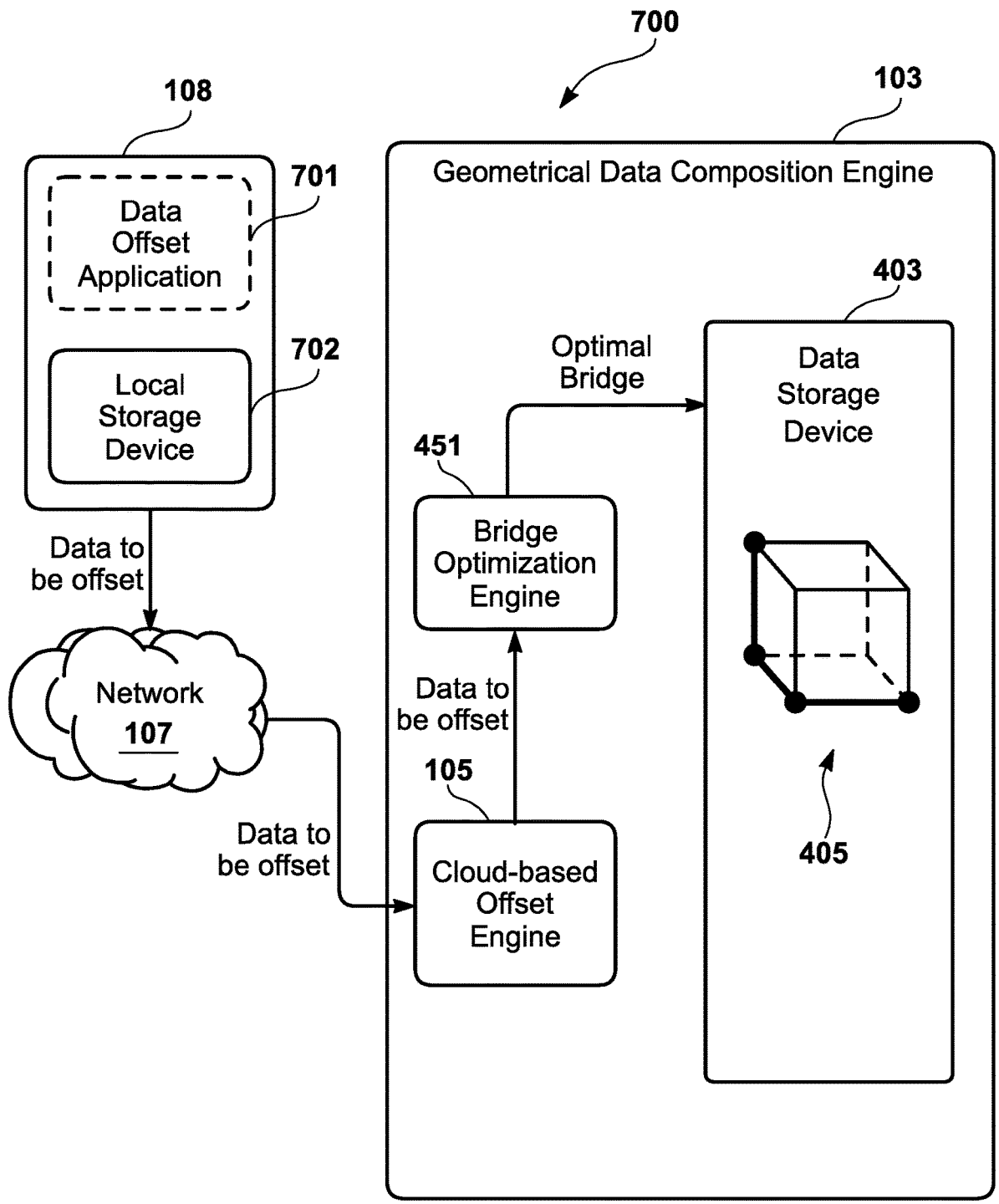
FIG. 7 illustrates a cloud-based offset configuration.

Accordingly, FIG. 7 illustrates a cloud-based offset configuration 700. In one embodiment, the computing device 108 has stored thereon a data offset application 701, which may be operated by the processor 252 illustrated in FIG. 2B. (The processor 252 may be specialized to execute the data offset application.) The data offset application 701 may monitor, at predetermined or randomized intervals via polling, a local data storage device 702 to determine compliance with the predetermined local data storage threshold. (Alternatively, the local data storage threshold may be calculated on-the-fly rather than in a predetermined form.) Upon determining that the external data exceeds the predetermined local data storage threshold, the data offset application 701 sends the external data to the cloud-based offset engine 105. Furthermore, the cloud-based offset engine 105 may send the data to be offset to the bridge optimization engine 451 of the geometrical data composition engine 103 to determine an optimal bridge for storing the external data to be offset. The bridge optimization engine 451 then determines an optimal bridge for storing the offset data in the geometrical data structure 405.

In an alternative embodiment, the data offset application 701 is stored, or at least partially implemented, by the cloud-based offset engine 105. For example, the cloud-based offset engine may poll the local data storage device 702 of the computing device 108 to determine compliance with the predetermined local data storage threshold. Upon determining that the local data storage device 702 is about to exceed, or has exceeded, the predetermined local data storage threshold, the cloud-based offset engine 452 may send an automatic alert to the computing device 108 to cease storing data directly on the local data storage device 702, and instead transmit the offset data via the network 107 to the cloud-based offset engine 105.

Figure 8A:
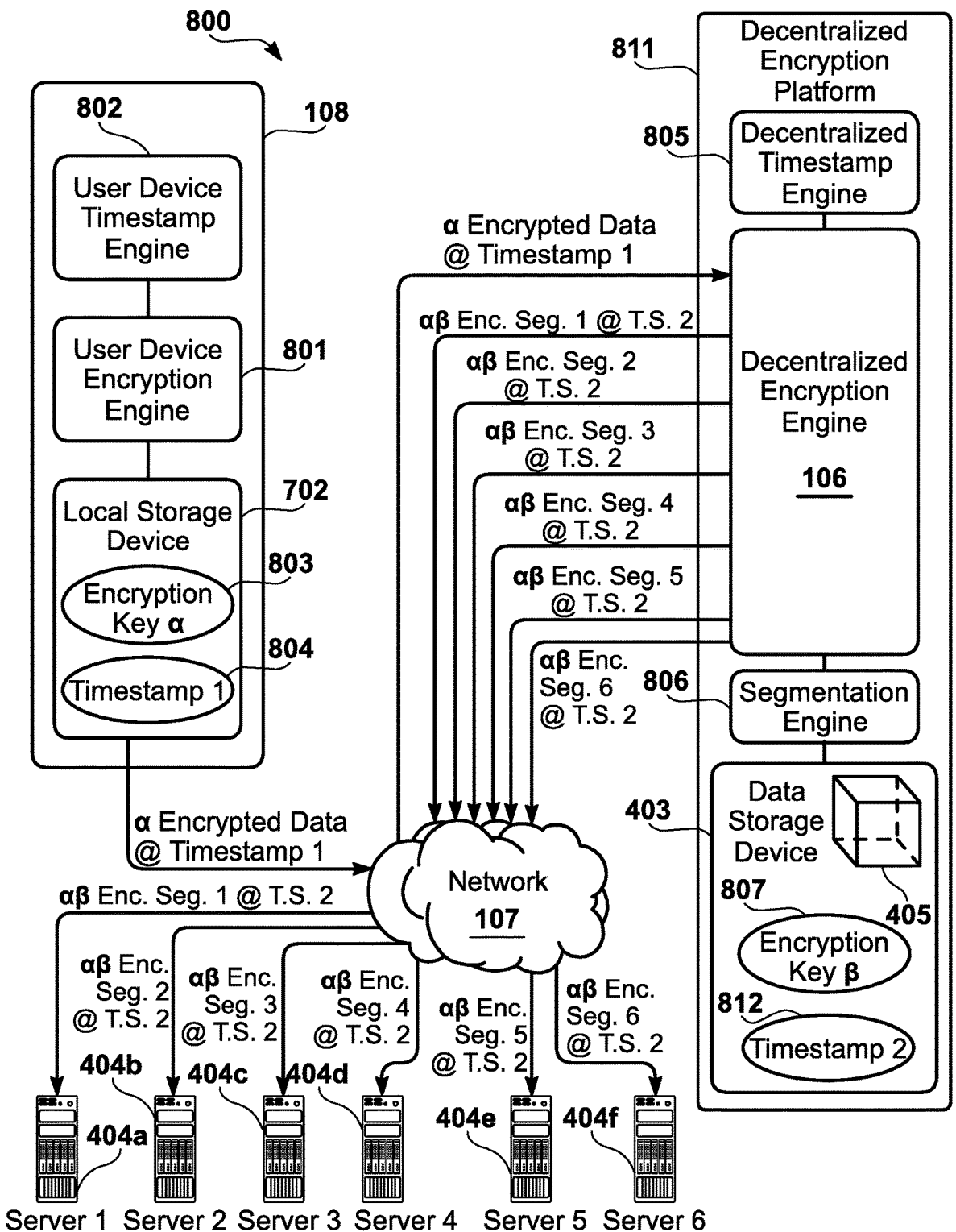
FIG. 8A illustrates a decentralized encryption configuration.
Figure 8B:
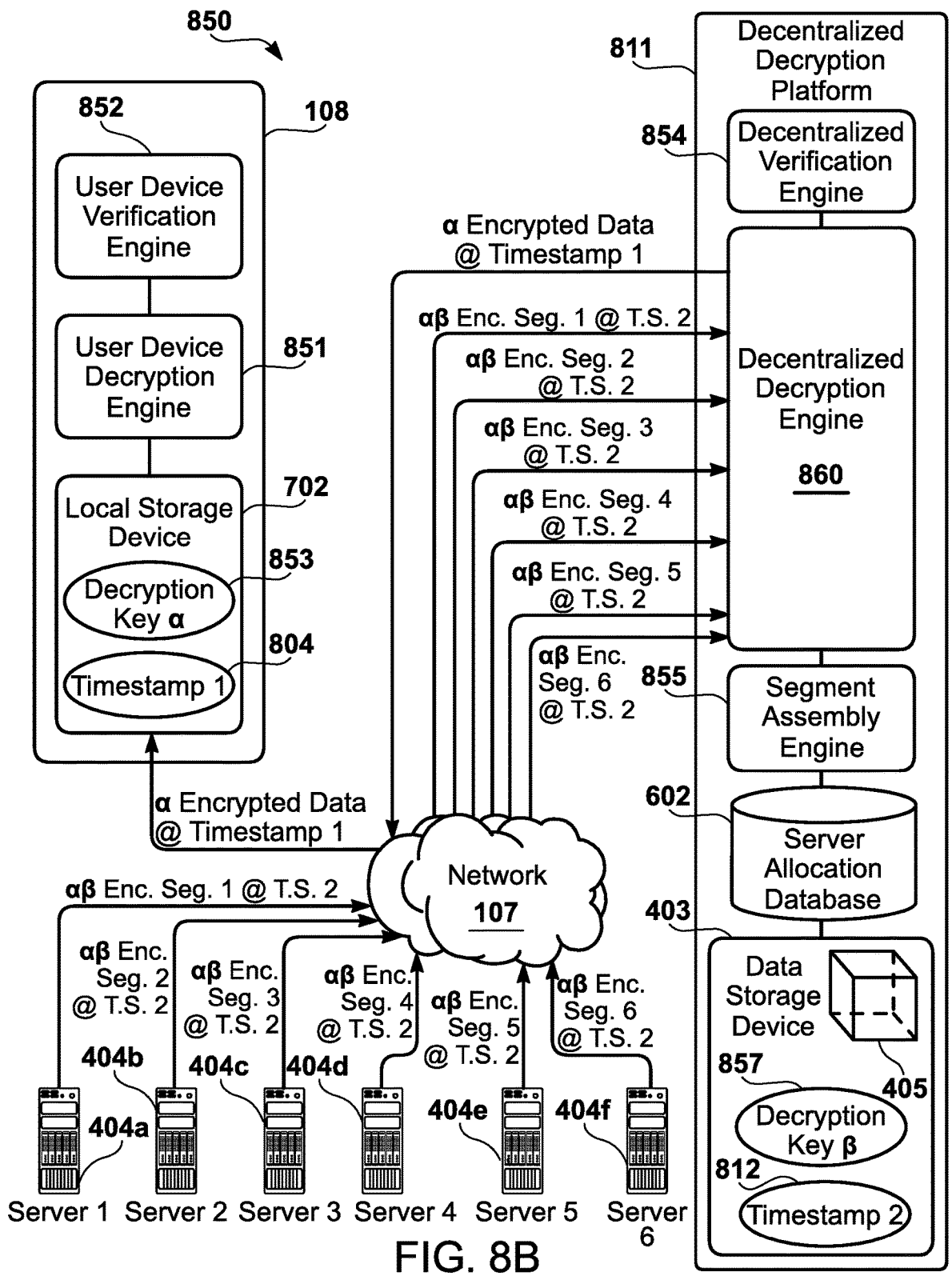
FIG. 8B illustrates a decentralized decryption configuration that may be used to decrypt the multi-level encrypted data, which was encrypted by the decentralized encryption engine illustrated in FIG. 8A.

To safeguard the data offset, compressed, stored via the geometrical data structure 405, and/or searched via the search engine 104, the data distribution platform 101 also may implement decentralized encryption/decryption, as illustrated by FIGS. 8A and 8B. In particular, FIG. 8A illustrates a decentralized encryption configuration 800. In one embodiment, the user device 108 may have a user device encryption engine 801 that performs a first level encryption of external data to be sent (e.g., offset) to a decentralized encryption platform 811. For example, the local data storage device 702 of the computing device 108 may store a first level encryption key $\alpha$ 803, which the user device 108 may use to encrypt the external data prior to sending it to the decentralized encryption platform 811. Further, the user device 108 may have a user device timestamp engine 802 that generates a timestamp at the time of the user device encryption.

Upon completion of the first level encryption and timestamp generation, the user device 108 may send the first level encrypted data and the first timestamp 804, via the network 107, to the decentralized encryption platform 811. (The data may also be compressed.) Furthermore, the decentralized encryption platform 811 has a decentralized encryption engine 106 that performs a second level of encryption, via a second encryption key $\beta$ 807 stored on the data storage device 403. Additionally, the decentralized encryption platform 811 has a decentralized timestamp engine 805 that generates a second timestamp 812 for the second level encryption. Subsequently, the decentralized encryption platform 811 uses a segmentation engine 806 to segment the multi-level encrypted data into a plurality of encrypted segments. In one embodiment, the quantity of segments is determined by the quantity of available servers having storage capacity, as indicated by a plurality of nodes in the geometrical data structure 405 stored on the data storage device 403. In another embodiment, the quantity of segments is determined based on a security threshold (e.g., a predetermined quantity such as ten segments). (A variety of methods may or may not be used to determine the quantity of segments.) The decentralized encryption engine 106 then transmits each of the segments, in multi-encrypted form along with the timestamps corresponding to the different levels of encryption, to various servers 404*a-f* according to the geometrical data structure 405. (In other embodiments, the data may be sent without the timestamps.) In an alternative embodiment, the segmentation engine 806 may initially segment the first level encrypted data prior to the decentralized encryption engine 106 encrypting the segments. As a result, multiple timestamps may be generated for each segment at the time of encryption of each segment.

FIG. 8B illustrates a decentralized decryption configuration 850 that may be used to decrypt the multi-level encrypted data, which was encrypted by the decentralized encryption engine 106 illustrated in FIG. 8A. A decentralized decryption platform 851 may use the server allocation database 602 to determine the location of the multi-level encrypted data segments stored on the various servers 404*a*-*f*. The decentralized decryption engine 106 may then request each of the multi-level encrypted data segments from each of the various servers 404*a*-*f*. Upon receiving the different segments, the decentralized decryption engine 106 may use a decentralized verification engine 854 to authenticate the timestamps of the encrypted segments. If the segments are authenticated, the decentralized decryption engine 106 may use a segment assembly engine 805 to reassemble the segments into the form prior to segmentation by the segmentation engine 806, as illustrated in FIG. 8A. The decentralized decryption engine 106 may use a decryption key β 857 to decrypt the reassembled data. In one embodiment, the decryption key β 857 is the same key as the encryption key β 807. In another embodiment, the decryption key β 857 is a component of a public-private key encryption pair, of which the encryption key β 807 is another component. Instead of assembling the external data prior to encryption, alternatively, the decentralized decryption platform 851 may decrypt each of the segments first, and then assemble the external data. Either way, upon decryption, the resulting data is the first level encrypted data. The decentralized decryption platform 851 may then send the first level encrypted data to the computing device 108 for decryption by a user device 860 decryption engine. To authenticate the external data, the computing device may use a user device verification engine 852 to verify the timestamp of the first level of encryption. Upon such verification, the user device decryption engine may use a decryption key α 853 to decrypt the first level encrypted data. In one embodiment, the decryption key α 853 is the same key as the encryption key α 853. In another embodiment, the decryption key α 853 is a component of a public-private key encryption pair, of which the encryption key α 853 is another component. If the data was compressed, the user device 851 also may perform decompression of the external data.

The multi-level encryption configuration described herein may be performed with additional layers of encryption. Alternatively, only one layer of encryption may be used.

As a result of implementing decentralized encryption, data can be offset and segmented for encrypted storage in multiple locations—no one location will store the data in full. Accordingly, even if the security of one of the servers storing the data is compromised, the integrity of the data as a whole remains intact.

Figure 9:
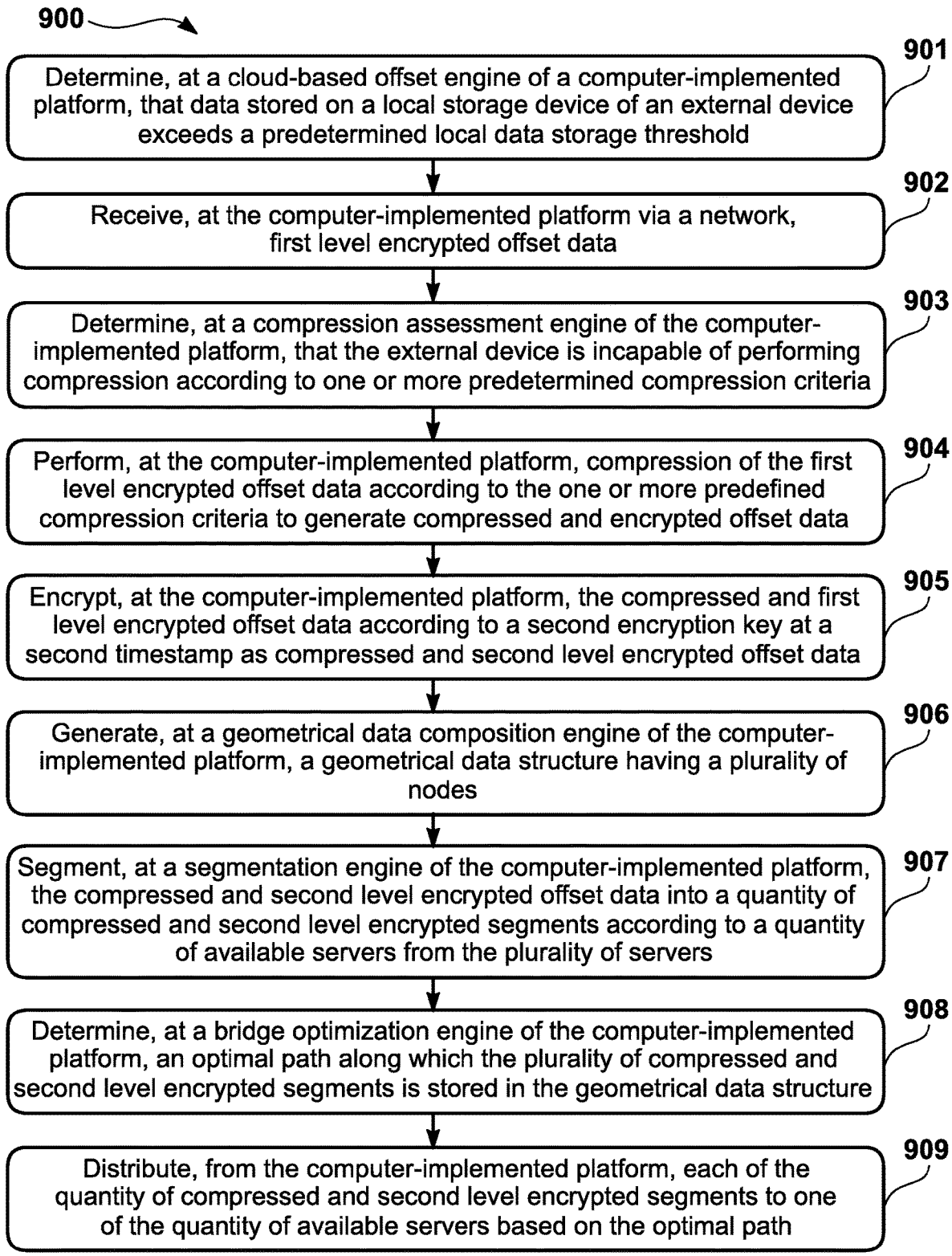
FIG. 9 illustrates a process that may be used to implement the data distribution platform illustrated in FIG. 1.

FIG. 9 illustrates a process 900 that may be used to implement the data distribution platform 101 illustrated in FIG. 1. At a process block 901, the process 900 determines, at the cloud-based offset engine 105 of a computer-implemented platform, that data stored on the local data storage device 255, illustrated in FIG. 2B, of an external device (e.g., computing device 108) exceeds a predetermined local data storage threshold. The external device is remotely situated from the computer-implemented platform. Furthermore, at a process block 902, the process 900 receives, at the computer-implemented platform via the network 107, illustrated in FIG. 1, first level encrypted offset data. The encrypted offset data is the data that is encrypted by the external device according to a first encryption key, and that is timestamped by the external device according to a first timestamp 804. Additionally, at a process block 903, the process 900 determines, at the compression assessment engine 102, illustrated in FIG. 1, of the computer-implemented platform, that the external device is incapable of performing compression according to one or more predefined compression criteria. Moreover, at a process block 904, the process 900 performs, at the computer-implemented platform, compression of the first level encrypted offset data according to the one or more predefined compression criteria to generate compressed and encrypted offset data. At a process block 905, the process 900 encrypts, at the computer-implemented platform, the compressed and first level encrypted offset data according to a second encryption key at a second timestamp as compressed and second level encrypted offset data. Additionally, at a process block 906, the process generates, at the geometrical data composition engine 103, illustrated in FIG. 1, of the computer-implemented platform, a geometrical data structure having a plurality of nodes. Each of the plurality of nodes is indicative of one of a plurality of servers. Furthermore, at a process block 907, the process 900 segments, at the segmentation engine 806, illustrated in FIG. 8A, of the computer-implemented platform, the compressed and second level encrypted offset data into a quantity of compressed and second level encrypted segments according to a quantity of available servers from the plurality of servers. In addition, at a process block 908, the process 900 determines, at the bridge optimization engine 451, illustrated in FIG. 7, of the computer-implemented platform, an optimal path along which the plurality of compressed and second level encrypted segments is stored in the geometrical data structure 405. Finally, at a process block 909, the process 900 distributes, from the computer-implemented platform, each of the quantity of compressed and second level encrypted segments to one of the quantity of available servers based on the optimal path.

A computer is herein intended to include any device that has a specialized processor as described above. For example, a computer may be a PC, laptop computer, set top box, cell phone, smartphone, tablet device, smart wearable device, portable media player, video player, etc.

It is understood that the apparatuses, systems, computer program products, and processes described herein may also be applied in other types of apparatuses, systems, computer program products, and processes. Those skilled in the art will appreciate that the various adaptations and modifications of the embodiments of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

I claim:

1. A computer program product comprising a non-transitory computer readable medium having a computer readable program stored thereon, wherein the computer readable program when executed on a computer causes the computer to:

determine, at a cloud-based offset engine of a computer-implemented platform, that data stored on a local storage device of an external device exceeds a predetermined local data storage threshold, the external device being remotely situated from the computer-implemented platform;

receive, at the computer-implemented platform via a network, first level encrypted offset data, the first level encrypted offset data being data that is encrypted by the external device according to a first encryption key, and that is timestamped by the external device according to a first timestamp;

determine, at a compression assessment engine of the computer-implemented platform, that the external device is incapable of performing compression according to one or more predefined compression criteria;

perform, at the computer-implemented platform, compression of the first level encrypted offset data according to the one or more predefined compression criteria to generate a set of compressed and first level encrypted offset data;

encrypt, at the computer-implemented platform, the set of compressed and first level encrypted offset data according to a second encryption key at a second timestamp as a set of compressed and second level encrypted offset data;

generate, at a geometrical data composition engine of the computer-implemented platform, a geometrical data structure having a plurality of nodes, each of the plurality of nodes being indicative of one of a plurality of servers;

segment, at a segmentation engine of the computer-implemented platform, the set of compressed and second level encrypted offset data into a quantity of compressed and second level encrypted segments according to a quantity of available servers from the plurality of servers;

determine, at a bridge optimization engine of the computer-implemented platform, an optimal path along which the quantity of compressed and second level encrypted segments is stored in the geometrical data structure; and distribute, from the computer-implemented platform, each of the quantity of compressed and second level encrypted segments to one of the quantity of available servers based on the optimal path.

2. The computer program product of claim 1, wherein the geometrical data structure corresponds to a cube.

3. The computer program product of claim 2, wherein the optimal path is a path along one or more edges of the cube having a fastest processing time for the distribution of the quantity of the compressed and second level encrypted segments to the quantity of the available servers.

4. The computer program product of claim 1, wherein the computer is further caused to receive, via an Application Programming Interface of a search engine at the computer-implemented platform, a search query for at least a portion of the data stored on the local storage device of the external device.

5. The computer program product of claim 4, wherein the computer is further caused to generate a plurality of first level encrypted reassembled segments by reassembling the quantity of compressed and second level encrypted segments, decompressing the quantity of compressed and second level encrypted segments, and decrypting the quantity of compressed and second level encrypted segments according to a second decryption key.

6. The computer program product of claim 5, wherein the second decryption key is the second encryption key.

7. The computer program product of claim 5, wherein the second encryption key is a first component of a private/public key infrastructure, and the second decryption key is a second component of a private/public key infrastructure.

8. The computer program product of claim 5, wherein the computer is further caused to verify authenticity of the plurality of first level encrypted reassembled segments according to the second timestamp.

9. The computer program product of claim 4, wherein the computer is further caused to recompose the data encrypted by the external device by decompressing and decrypting the plurality of first level encrypted reassembled segments according to a first decryption key.

10. The computer program product of claim 9, wherein the first decryption key is the first encryption key.

11. The computer program product of claim 9, wherein the first encryption key is a first component of a private/public key infrastructure, and the first decryption key is a second component of a private/public key infrastructure.

12. The computer program product of claim 9, wherein the computer is further caused to verify authenticity of the data encrypted by the external device according to the second timestamp.

13. A computer-implemented platform comprising:
a cloud-based offset engine that determines data stored on a local storage device of an external device exceeds a predetermined local data storage threshold, the external device being remotely situated from the computer-implemented platform;

a receiver that receives, via a network, first level encrypted offset data, the first level encrypted offset data being data that is encrypted by the external device according to a first encryption key, and that is timestamped by the external device according to a first timestamp;

a compression assessment engine that determines that the external device is incapable of performing compression according to one or more predefined compression criteria and that performs compression of the first level encrypted offset data according to the one or more predefined compression criteria to generate a set of compressed and first level encrypted offset data;

an encryption engine that encrypts the set of compressed and first level encrypted offset data according to a second encryption key at a second timestamp as a set of compressed and second level encrypted offset data;

a geometrical data composition engine that generates a geometrical data structure having a plurality of nodes, each of the plurality of nodes being indicative of one of a plurality of servers;

a segmentation engine that segments the set of compressed and second level encrypted offset data into a quantity of compressed and second level encrypted segments according to a quantity of available servers from the plurality of servers;

a bridge optimization engine that determines an optimal path along which the quantity of compressed and second level encrypted segments is stored in the geometrical data structure; and a transmitter that distributes, via the network, each of the quantity of compressed and second level encrypted segments to one of the quantity of available servers based on the optimal path.

14. The computer-implemented platform of claim 13, further comprising a search engine that receives a search query, via an Application Programming Interface of the search engine, for at least a portion of the data stored on the local storage device of the external device.

15. The computer-implemented platform of claim 13, wherein the geometrical data structure corresponds to a cube.

16. The computer-implemented platform of claim 15, wherein the optimal path is a path along one or more edges of the cube having a fastest processing time for the distribution of the quantity of the compressed and second level encrypted segments to the quantity of the available servers.

17. A process comprising:
determining, at a cloud-based offset engine of a computer-implemented platform, that data stored on a local storage device of an external device exceeds a predetermined local data storage threshold, the external device being remotely situated from the computer-implemented platform;
receive, at the computer-implemented platform via a network, first level encrypted offset data, the first level encrypted offset data being data that is encrypted by the external device according to a first encryption key, and that is timestamped by the external device according to a first timestamp;
encrypt, at the computer-implemented platform, the first level encrypted offset data according to a second encryption key at a second timestamp as second level encrypted offset data;
generate, at a geometrical data composition engine of the computer-implemented platform, a geometrical data structure having a plurality of nodes, each of the plurality of nodes being indicative of one of a plurality of servers;
segment, at a segmentation engine of the computer-implemented platform, the second level encrypted offset data into a quantity of second level encrypted segments according to a quantity of available servers from the plurality of servers;
determine, at a bridge optimization engine of the computer-implemented platform, an optimal path along which the quantity of second level encrypted segments is stored in the geometrical data structure; and
distribute, from the computer-implemented platform, each of the quantity of second level encrypted segments to one of the quantity of available servers based on the optimal path.

18. The process of claim 17, further comprising a search engine that receives a search query, via an Application Programming Interface of the search engine, for at least a portion of the data stored on the local storage device of the external device.

19. The process of claim 17, wherein the geometrical data structure corresponds to a cube.

20. The process of claim 19, wherein the optimal path is a path along one or more edges of the cube having a fastest processing time for the distribution of the quantity of the compressed and second level encrypted segments to the quantity of the available servers.

* * * * *